United States Patent

Takeda et al.

(10) Patent No.: US 6,491,613 B2
(45) Date of Patent: Dec. 10, 2002

(54) ROLLER FOR OFFICE AUTOMATION EQUIPMENT

(75) Inventors: Kazuhiro Takeda, Aichi-ken (JP); Sumio Oinuma, Gifu-ken (JP); Naoki Yamaguchi, Aichi-ken (JP); Hiroshige Hiramatsu, Aichi-ken (JP); Hitoshi Yoshikawa, Aichi-ken (JP)

(73) Assignee: Tokai Rubber Industries, Ltd., Komaki (JP)

( * ) Notice: Subject to any disclaimer, the term of this patent is extended or adjusted under 35 U.S.C. 154(b) by 0 days.

(21) Appl. No.: 09/919,804

(22) Filed: Aug. 2, 2001

(65) Prior Publication Data

US 2002/0039955 A1 Apr. 4, 2002

(30) Foreign Application Priority Data

Aug. 3, 2000 (JP) .......................................... 2000-236121

(51) Int. Cl.$^7$ ................................................ B23P 15/00
(52) U.S. Cl. .......................................... 492/59; 492/56
(58) Field of Search ................... 492/56, 59; 428/36.91, 428/35.91, 447, 448

(56) References Cited

U.S. PATENT DOCUMENTS 4,076,652 A * 2/1978 Ganci et al. ................. 252/504
5,810,705 A * 9/1998 Mimura et al. ................ 492/56
6,035,172 A * 3/2000 Mimura et al. ............. 399/286
6,146,320 A * 11/2000 Yoshikawa et al. ........... 492/56

* cited by examiner

Primary Examiner—I. Cuda-Rosenbaum
(74) Attorney, Agent, or Firm—Armstrong, Westerman & Hattori LLP

(57) ABSTRACT

A roller for office automation equipment which does not suffer from impairment of a cross-linking reaction or occurrence of a delay therein, is excellent in permanent set resistance and low-temperature bleedability, and permits achievement of a low hardness. A preferred roller for office automation equipment comprises a base rubber layer, an intermediate layer and a surface layer formed in this sequence on an outer peripheral surface of a shaft, wherein the base rubber layer is formed of a liquid rubber composition containing the following constituents (A) to (D):

(A) a liquid rubber, derived from at least one of butadiene and isoprene, and having a structural unit ($\alpha$) having an alkenyl group on the side chain thereof;

(B) a hydrosilyl cross-linking agent;

(C) a hydrosilylation catalyst; and (D) a mineral oil containing not more than 0.31 wt. % sulfur.

6 Claims, 1 Drawing Sheet

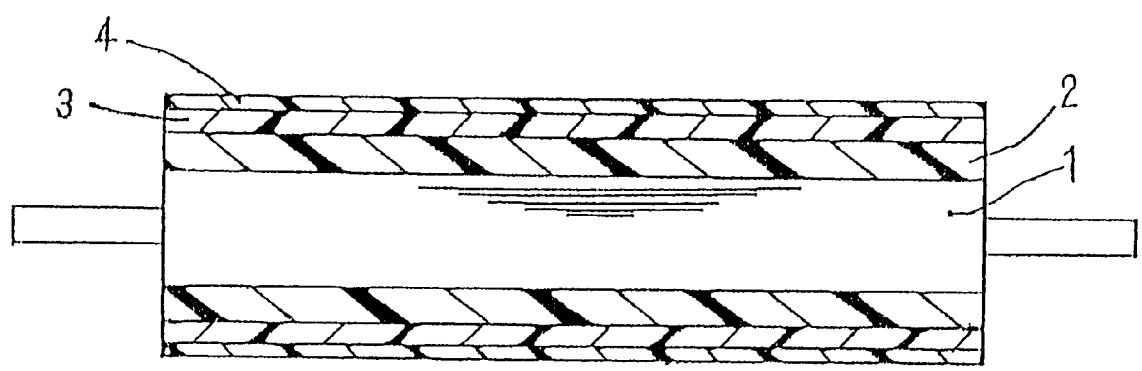
FIGURE

ROLLER FOR OFFICE AUTOMATION EQUIPMENT

BACKGROUND OF THE INVENTION

1. Field of the Invention

The present invention relates generally to a roller for office automation equipment, and, more particularly, to a developing roller, a charging roller, a transfer roller, a paper feed roller, a de-electricity roller, or a fixing roller used in office automation equipment such as a copying machine, a printer, or a facsimile machine.

2. Description of the Art

A roller for office automation equipment having, for example, a base rubber layer formed on an outer periphery of a shaft thereof, and further, an intermediate layer or a surface layer formed on an outer periphery thereof, has long been used. Conventional materials for forming the above-mentioned base rubber layer have included rubber compositions mainly comprising general-purpose kinds of rubber such as ethylene-propylene-diene terpolymer rubber (EPDM), butadiene rubber, isoprene rubber, acrylonitrile-butadiene rubber, chloroprene rubber, and styrene-butadiene rubber.

However, the aforementioned rubber compositions mainly comprising general-purpose kinds of rubber such as EPDM, while being excellent in terms of material cost, have a defect of being inferior in formability because of a large molecular weight and a low fluidity. Attempts have been made to improve formability by mixing oil in a larger quantity so as to achieve a lower viscosity. Sufficient formability has not as yet been achieved, however, and also there is a defect of a deteriorated compressive permanent strain, one of the properties a roller is required to have. To solve these problems, a liquid rubber composition mainly comprising urethane elastomer or a liquid silicone rubber was proposed and has already been industrialized.

The above-mentioned liquid rubber composition mainly comprising silicone rubber is excellent in formability and provides a high compressive permanent strain property. In contrast, it has a disadvantage in material cost in that liquid silicone rubber is very expensive, and also has a low wear resistance. On the other hand, the above-mentioned liquid rubber composition mainly comprising urethane elastomer, while having the advantages of excellent wear resistance, and a lower material cost as compared with the liquid silicone rubber, has the defect of an insufficient compressive permanent strain property when the hardness of the urethane elastomer is reduced.

In view of these problems, the present applicant has proposed a liquid rubber composition which is derived from at least one of butadiene and isoprene, and mainly comprises a liquid rubber having a structural unit ($\alpha$) having an alkenyl group on a side chain thereof, and contains a hydrosilyl cross-linking agent and a hydrosilylation catalyst, and suggested use of this liquid rubber composition for various components of office automation equipment (Japanese Patent Application No. 11-74487).

However, in order to use the aforementioned liquid rubber composition as a base rubber layer for a roller in office automation equipment, there is a limit in the degree of freedom in material design by a combination of the molecular weight of the liquid rubber and the cross-linking agent, and the selection of additives is also problematic. Therefore, it is difficult to design a material so as to satisfy hardness, permanent set resistance and reaction stability requirements. Particularly, when adding a softening agent to obtain an appropriate softness, selection of a softening agent may impair a cross-linking reaction or may cause a delay. Mutual solubility and saturation property with a polymer may cause premature separation before the cross-linking reaction, or may cause bleeding (soaking) after the cross-linking reaction.

SUMMARY OF THE INVENTION

The present invention was developed in view of the above circumstances, and has an object to provide a roller for office automation equipment which does not impair the cross-linking reaction or does not cause a delay, is excellent in permanent set resistance and low-temperature bleedability, and achieves a lower hardness.

To achieve the above-mentioned object, the roller for office automation equipment according to the present invention comprises a shaft and a base rubber layer formed on an outer periphery of the shaft, wherein the base rubber layer is formed of a liquid rubber composition containing the following constituents (A) to (D):

(A) a liquid rubber, derived from at least one of butadiene and isoprene, and having a structural unit ($\alpha$) having an alkenyl group on the side chain thereof;

(B) a hydrosilyl cross-linking agent;

(C) a hydrosilylation catalyst; and (D) a mineral oil containing not more than 0.31 wt. % sulfur.

The present inventors carried out extensive studies so as to satisfy requirements of the base rubber layer of the roller for office automation equipment for the liquid rubber composition proposed by the present applicant. In this process, experiments and studies were conducted to prevent occurrence of bleed in the base rubber layer. As a result, findings were obtained to the effect that a mineral oil was preferable to a synthetic oil. In the process of experiments and studies carried out to improve reaction stability and permanent set resistance, attention was given to the fact that, in the cross-linking reaction of the above-mentioned liquid rubber composition, the alkenyl group present in a molecule in the so-called pendant manner, from among structural units of a specific liquid rubber, serves as a cross-linking site and the hydrosilyl cross-linking agent and the hydrosilylation catalyst exert action on this alkenyl group. That is, attention was directed toward the reaction in which the hydrosilylation catalyst (platinum-based catalyst or the like) is coordinated with the alkenyl group of the liquid rubber, and combines with the hydrosilyl group. Since restriction of the alkenyl group is associated with impairment and delay of the cross-linking reaction, experiments were carried out on materials in the mineral oil which restrict the alkenyl group, bringing about the following findings. The presence of sulfur in the mineral oil in an amount of over 0.31 wt. % impairs the cross-linking reaction, leading to deterioration of material preservation, reaction stability and permanent set resistance. On the basis of these findings, the present inventors found it possible to achieve the desired object by using a liquid rubber composition containing a specific liquid rubber (constituent A), a hydrosilyl cross-linking agent (constituent B), a hydrosilylation catalyst (constituent C), and a specific mineral oil (constituent D), as a material for forming the base layer of the roller for office automation equipment and developed the present invention.

Particularly, when using a naphthene-based oil or a paraffin-based oil as the mineral oil (constituent D), there are a compositions available excellent in photosensitive drum contamination.

BRIEF DESCRIPTION OF THE DRAWINGS

The sole FIGURE of the drawings is a sectional view illustrating an embodiment of the roller for office automation equipment of the present invention.

DESCRIPTION OF THE PREFERRED EMBODIMENTS

Embodiments of the present invention will now be described.

The roller for office automation equipment of the invention comprises, for example as shown in FIGURE, a base rubber layer 2 formed along an outer peripheral surface of a shaft 1, an intermediate layer 3 formed on an outer peripheral surface of the base rubber layer 2, and a surface layer 4 formed on an outer peripheral surface of the intermediate layer 3. The most important feature of the roller for office automation equipment of the invention is that the base rubber layer 2 is made of a specific liquid rubber composition.

There is no particular restriction imposed on the shaft 1. For example, a core made of a solid metal, or a metal cylinder made by hollowing out a solid metal rod may be used. Suitable materials for the shaft include stainless steel, aluminum and plated iron. As required, the shaft 1 may be coated with an adhesive or a primer. The adhesive or the primer may be made conductive as required.

The base rubber layer 2 formed on the outer peripheral surface of the shaft 1 is made of the subject liquid rubber composition. This liquid rubber composition is obtained by use of a specific liquid rubber (constituent A), a hydrosilyl cross-linking agent (constituent B), a hydrosilylation catalyst (constituent C), and a specific mineral oil used as softening agent (constituent D).

The specific liquid rubber (constituent A) is derived from at least one of butadiene and isoprene, and has a structural unit (α) having an alkenyl group on a side chain. The specific structural unit (α) is not subject to any particular restriction. Applicable structural units (α) include ones expressed by the following structural formulae (I) to (III). The alkenyl group (e.g., vinyl group, isopropenyl group) forming a side chain in this structural unit participates in the cross-linking reaction. This causes the liquid rubber to have a three-dimensional mesh structure which exhibits rubber-like elasticity.

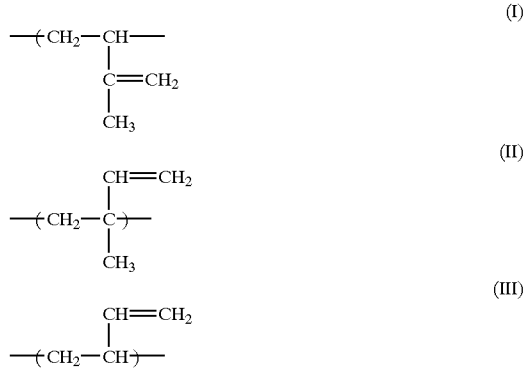

No particular restriction is imposed on the liquid rubber (constituent A) having the above-mentioned specific structural unit (α). It may, for example, be liquid butadiene rubber, liquid isoprene rubber, or butadiene-isoprene copolymer liquid rubber.

The specific liquid rubber (constituent A) may have a structural unit derived from styrene, together with the above-mentioned structural unit (α). Styrene may have a substituent which should preferably be an alkyl group which should, more preferably, be an alkyl group having a carbon number of from 1 to 5 such as methyl group, ethyl group, propyl group, isopropyl group, butyl group, sec-butyl group, and tert-butyl group. The liquid rubber (constituent A) may for example be butadiene-styrene copolymer liquid rubber, isoprene-styrene copolymer liquid rubber, or butadiene-isoprene-styrene terpolymer liquid rubber.

Among other kinds of liquid rubber having a structural unit derived from styrene of the specific liquid rubber (constituent A), isoprene-styrene copolymer liquid rubber having a repetitive unit expressed by the following general formula (1) is particularly suitable:

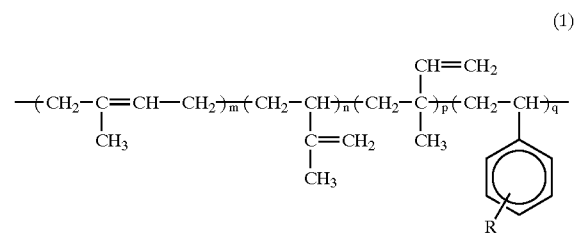

where R represents a hydrogen atom or an alkyl group having a carbon number of from 1 to 5, m is 0 or a positive number, n is a positive number, p is 0 or a positive number, and q is a positive number.

The content of the structural unit (α) in the specific liquid rubber (constituent A) should preferably be within a range of from 1 to 80 wt. % of the entire liquid rubber. When the content of the structural unit (α) is under 1 wt. %, the cross-linking reaction may become insufficient and may lead to a lower stability for the resultant cross-linked structure. When the content of the structural unit (α) is over 80 wt. %, on the other hand, the mesh structure resulting from cross-linking may become too dense, and this may lead to a harder or more brittle cross-linked structure. Among others, when the specific liquid rubber (constituent A) does not have a structural unit derived from styrene, the content of the structural unit (α) should preferably be within a range of from 5 to 70 wt. % of the liquid rubber as a whole. When the specific liquid rubber (constituent A) has a structural unit derived from styrene in addition to the structural unit (α), the content of the structural unit (α) should preferably be within a range of from 1.5 to 70 wt. % of the liquid rubber as a whole.

When the specific liquid rubber (constituent A) has a structural unit derived from styrene in addition to the structural unit (α), the content of the structural unit derived from styrene should preferably be within a range of from 5 to 20 wt. % of the liquid rubber as a whole, or more preferably, from 6 to 15 wt. %. If the content of the structural unit derived from styrene is under 5 wt. %, the effect of styrene is not exhibited in full in some cases. If the content is over 20 wt. %, in contrast, the liquid rubber composition may have a higher viscosity, leading to deterioration of the formability or the compressive permanent strain property.

The number-average molecular weight (Mn) of the specific liquid rubber (constituent A) should preferably be within a range of from 700 to 100,000, or more preferably, from 2,000 to 80,000. A number-average molecular weight within these ranges gives an excellent handling convenience and permits satisfactory progress of the cross-linking reaction. Particularly, when the specific liquid rubber (constituent A) does not have a structural unit derived from styrene, the number-average molecular weight (Mn) should preferably be within a range of from 700 to 60,000, or more preferably, from 2,000 to 50,000. When the specific liquid rubber (constituent A) has a structural unit derived from styrene, the number-average molecular weight (Mn) should preferably be within a range of from 1,000 to 100,000, or more preferably, from 10,000 to 80,000.

The specific liquid rubber (constituent A) can be prepared, for example, as follows. The process comprises the steps of first providing at least one of butadiene and isoprene, and as required, styrene, as monomer constituents; and then causing single polymerization or copolymerization by any of various methods in the presence of an appropriate catalyst (for example, a lithium-based catalyst) using these monomer constituents.

No particular restriction is imposed on the hydrosilyl cross-linking agent (constituent B) used together with the specific liquid rubber (constituent A). For example, organohydrogen polysiloxane expressed by the following general formula (2) is suitable.

$R_aH_bSiO_{4-(a+b)/2}$           (2)

where R represents a monohydric hydrocarbon group not having an aliphatic unsaturated coupling; and a=0 to 3, b=1 to 3, and a+b=1 to 3.

There is no particular restriction imposed on the molecular structure of the above-mentioned specific organohydrogen polysiloxane which may be of straight chain, branched chin, cyclic or net-shaped. No particular restriction is imposed on the degree of polymerization of the above-mentioned organohydrogen polysiloxane. However, it should preferably have a viscosity at 25° C. within a range of from $2.3 \times 10^{-5}$ to $1.0 \times 10^{-2}$ m²/s.

From among the above-mentioned hydrosilyl cross-linking agents (constituent B), hydrocarbon-based hydrosilyl compounds expressed by the following general formulae (3) to (5) are suitable:

(3)

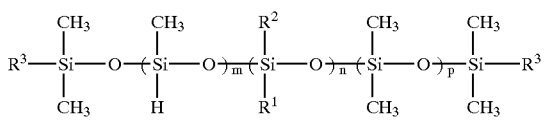

where $R^1$ represents a hydrocarbon group having a carbon number of from 2 to 20; $R^2$ represents a hydrocarbon group having a carbon number of from 1 to 20; $R^3$ represents a hydrogen atom or a methyl group, which may be the same or different from each other; m is 2 or a larger positive number; n is 1 or a larger positive number; p is 0 or a positive number, and where m, n and p satisfy $5 \leq m+n+p \leq 200$; and the repetition units m, n, and p may be random polymerization or block polymerization.

(4)

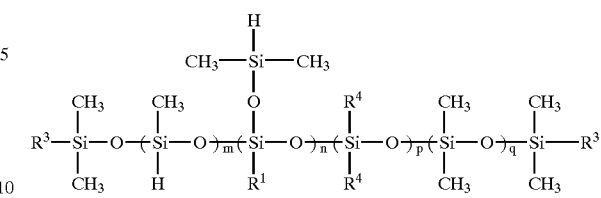

where $R^1$ represents a hydrocarbon group having a carbon number of from 2 to 20; $R^3$ represents a hydrogen atom or a methyl group, which may be the same or different from each other; $R^4$ represents a hydrocarbon group having a carbon number of from 1 to 20, which may be the same or different from each other; m is 0 or a positive number; n is 1 or a larger positive number; p is 0 or a positive number; q is 0 or a positive number; the repetition units m, n, p and q may be random polymerization or block polymerization.

(5)

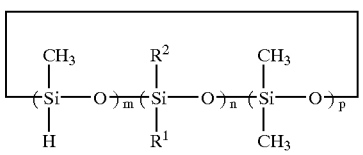

where $R^1$ represents a hydrocarbon group having a carbon number of from 2 to 20; $R^2$ represents a hydrocarbon group having a carbon number of from 1 to 20; m is 2 or a larger positive number; n is 1 or a larger positive number; p is 0 or a positive number, and m, n and p satisfy $3 \leq m+n+p \leq 50$; the repetition units m, n and p may be random polymerization or block polymerization.

The hydrocarbon-based hydrosilyl compounds expressed by the above-mentioned general formulae (3) to (5) can be prepared, for example, by the following methods (a) to (c). Among others, the method (c) is particularly suitable because of the possibility being relatively simple to apply.

(a) A manufacturing method where a hydrocarbon-based compound having a chlorosilyl group (SiCl) in its molecular structure is reacted with a reducing agent (LiAlH$_4$, NaBH$_4$ or the like), thereby reducing the chlorosilyl group into a hydrosilyl group.

(b) A manufacturing method which uses a reaction between a hydrocarbon-based compound having a functional group and a compound having both a functional group capable of reacting with the above-mentioned functional group and a hydrosilyl group.

(c) A manufacturing method which uses a reaction between a hydrocarbon-based compound having an alkenyl group and a polyhydrosilane compound so that a hydrosilyl group remains in the molecular structure of the resultant reaction product.

The blending ratio of the hydrosilyl cross-linking agent (constituent B) should preferably be within a range of from 1.5 to 15 weight parts (hereinafter expressed simply as "parts") relative to 100 parts of the specific liquid rubber (constituent A), or more preferably, from 2 to 8 parts. If it is under 1.5 parts, the cross-linking reaction may be insufficient, leading to deterioration of strength or compressive permanent strain. If it is over 15 parts, cross-linking may proceed too significantly, leading to a harder and more brittle product, or to a shorter pot life.

No particular restriction is imposed on the hyhdrosilylation catalyst (constituent C) used together with the specific liquid rubber (constituent A) and the hydrosilyl cross-linking agent (constituent B) so long as the catalyst can display a catalytic function for the cross-liking reaction. For example, applicable catalysts include platinum chloride, a complex of platinum chloride with an alcohol, aldehyde, ketone or the like; platinum/vinylsiloxane complex; platinum/olefin complex; platinum/phosphite complex; platinum, alumina, silica and carbon black which carry solid platinum. Suitable catalysts other than platinum compounds include palladium compounds, rhodium compounds, iridium compounds, and ruthenium compounds, which may be used singly or in combination of two or more thereof.

The amount of blended hydrosilylation catalyst (constituent C), to be appropriately selected in accordance with the kind of the specific liquid rubber (constituent A) or the hydrosilyl cross-linking agent (constituent B), should preferably be within a range of from 0.0001 to 0.03 parts relative to 100 parts of the specific liquid rubber (constituent A).

For the specific mineral oil (constituent D) used together with the constituents A to C, the sulfur content should be not more than 0.31 wt. %. By having the sulfur content at such a low level, the cross-linking reaction is not impaired or delayed by the hydrosilyl cross-linking agent (constituent B), and a satisfactory base rubber layer is formed. By using a specific mineral oil (constituent D), an advantage of inhibiting occurrence of bleeding as compared with the case of a synthetic oil is realized. A more preferable sulfur content is not more than 0.15 wt. %.

The mineral oil mainly comprises a petroleum oil known as extender or process oil. This petroleum oil is a mixture of aromatic rings, naphthene rings, and paraffin chains. An oil in which the paraffin chain carbon number accounts for more than 50% of the total carbon number is called a paraffin-based oil; an oil in which the naphthene ring carbon number accounts for 30 to 45% is called a naphthene-based oil; and an oil in which the aromatic ring carbon number is at least 35% is called an aromatic-based oil.

Among others, the naphthene-based oil and the paraffin-based oil can be suitably used from the point of view of avoidance of photosensitive drum contamination.

From the point of view of handling convenience, the viscosity (40%) of the mineral oil should preferably be within a range of from 10 to 300 mm$^2$/s for the naphthene-based oil, within a range of from 10 to 400 mm$^2$/s for the paraffin-based oil, and within a range of from 600 to 700 mm$^2$/s for the aromatic-based oil.

More specifically, a concrete example of the naphthene-based oil is SUNSEN 410 OIL (made by Nihon Sun Oil Co., Ltd., sulfur content: not more than 0.02 wt. %).

Examples of the paraffin-based oil include SUNSEN 150 OIL (made by Nihon Sun Oil Co., Ltd., sulfur content: not more than 0.01 wt. %), and SUNSEN 2100 OIL (made by Nihon Sun Oil Co., Ltd., sulfur content: not more than 0.01 wt. %).

When using a naphthene-based oil as the specific mineral oil (constituent D), the blending ratio should preferably be within a range of from 10 to 200 parts relative to 100 parts of the specific liquid rubber (constituent A), or more preferably, from 10 to 150 parts. When using a paraffin-based oil, the blending ratio should preferably be within a range of from 10 to 80 parts relative to 100 parts of the specific liquid rubber (constituent A), or more preferably, from 10 to 60 parts.

Apart from the above-mentioned constituents A to D, a filler such as silica, quartz, calcium carbonate, talc, or mica; a conduction agent, plasticizer, cross-linking accelerator, a cross-linking delaying agent and/or an aging inhibitor may appropriately be added to the subject liquid rubber composition.

The subject liquid rubber composition can be prepared for example as follows. A main liquid is first prepared by mixing the specific liquid rubber (constituent A) and the hydrosilylation catalyst (constituent C) at an appropriate blending ratio. In addition, a liquid hardener containing the hydrosilyl cross-linking agent (constituent B) and the specific mineral oil (constituent D) is prepared. As required, constituents other than the aforementioned constituents A to D may be added into the main liquid and/or the liquid hardener. Upon using, the composition can be prepared by mixing the main liquid and the liquid hardener. From the point of view of pot stability, the main liquid and the liquid hardener of the subject liquid rubber composition should preferably be separately stored, and prepared into the final composition by mixing them when using.

No particular restriction is imposed on the material for forming the intermediate layer 3 formed on the outer peripheral surface of the base rubber layer 2. Suitable materials include, for example, acrylonitrile-butadiene rubber (nitrile rubber, hereinafter abbreviated as "NBR"), polyurethane-based elastomer, chloroprene rubber (CR), natural rubber, butadiene rubber (BR), butyl rubber (IIR), hydrine rubber (ECO, CO) and nylon. Among others, NBR is particularly suitable in terms of adhesion and stability of a coating solution.

As required, a conduction agent, a cross-linking agent, a cross-linking accelerator, stearic acid, ZnO (zinc white), and/or a softener may be blended into the material for forming the intermediate layer 3. Suitable conduction agents include carbon black, graphite, potassium titanate, iron oxide, c-TiO$_2$, c-ZnO, c-indium oxide, and ion conduction agent (quaternary ammonium salt, boric acid salt and surfactant). The notation "c-" means that the substance is conductive.

There is no particular restriction imposed on the material for forming the surface layer 4 formed on the outer peripheral surface of the intermediate layer 3. Suitable materials include, for example, polyurethane-based elastomer, acryl polymer, and polyamide. These materials are used singly or in combination of two or more.

As required, a conduction agent and/or a hardener may be added to the material forming the surface layer 4.

The roller for office automation equipment can be manufactured, for example, as follows. First, the liquid rubber composition (the main liquid and the liquid hardener) forming the base rubber layer 2 may be prepared in the same manner as above. The material for forming the intermediate layer 3 (coating solution) may be prepared by kneading individual constituents of the material by means of a kneader such as a roller, adding an organic solvent to the resultant mixture, and mixing and stirring the same. Furthermore, the material for forming the surface layer 4 (coating solution) may be prepared in accordance with the above-mentioned method.

Then, a mold for injection molding which has a shaft serving as a core is filled with the main liquid and the liquid hardener which will form the material of the base rubber layer (liquid rubber composition), and heating and cross-linking are performed under certain conditions. Then, the mold is stripped off from the resultant composition, thereby producing a base roller having a base rubber layer formed along the outer peripheral surface of the shaft. Then, the intermediate layer is formed by coating the material for forming the intermediate layer onto the outer peripheral surface of the base rubber layer. Thereafter, the surface layer is formed by coating the material for forming the surface layer (coating solution) onto the outer peripheral surface of the intermediate layer. The intermediate layer thus is formed on the outer peripheral surface of the base rubber layer, and the surface layer is formed on the outer peripheral surface of the intermediate layer, thereby providing the three-layer structure roller for office automation equipment as shown in FIGURE.

The method of forming the base rubber layer 2 is not limited to an injection molding process, but may be by a mold forming method or a method of polishing after press forming. The method of coating the coating solution is not limited to a particular one as described above, but applicable methods include conventionally known methods such as a dipping process, a spray coating process and a roll coating process.

The roller for office automation equipment of the invention, although being particularly suitable for use as a developing roller, is not limited to a developing roller. The roller is also suitable as a transfer roller, a charging roller, a de-electricity roller, or a fixing roller. The structure of the roller for office automation equipment of the invention is not limited to the above-described three-layer structure, but rather any number of appropriate layers may be formed. However, the base rubber layer must be formed of the subject liquid rubber composition.

In the roller for office automation equipment of the invention, the thickness of each layer generally is determined according to the particular use of the roller in the office automation equipment. For example, when using the roller as a developing roller, the thickness of the base rubber layer should preferably be within a range of from 0.5 to 10 mm, or more preferably, from 2 to 6 mm. The thickness of the intermediate layer is usually within a range of from 1 to 150 μm, or more preferably, from 3 to 30 μm. The thickness of the surface layer is usually within a range of from 3 to 100 μm, or more preferably, from 5 to 50 μm.

Some examples of the invention will now be described, together with comparative examples.

EXAMPLE 1

Isoprene rubber which was liquid rubber (made by Kuraray Co., Ltd., KURAPRENE LIR-30) [Mn: 40,000, structural unit (α) content: 9.4 wt. %] in an amount of 100 parts, 4 parts hydrosilyl cross-linking agent expressed by the following structural formula (6), 0.01 parts platinum carbonyl complex (made by Azumax Co., Ltd., SIP 6829.0) which was a hydrosilylation catalyst, 100 parts naphthene-based oil (made by Nihon Sun Oil Co., Ltd., SUNSEN 410 OIL, sulfur content: not more than 0.02 wt. %, viscosity at 40° C.: 20.1 mm²/s), 5 parts silica (made by Nihon Aerogil Co., Ltd., AEROGIL 200), and 10 parts conduction agent (carbon black) were provided. A main liquid was prepared by mixing butadiene rubber which was the liquid rubber, platinum carbonyl complex, silica and the conduction agent, and a liquid hardener was prepared by mixing the hydrosilyl cross-linking agent and the mineral oil. Then, a liquid rubber composition was prepared by mixing these two mixtures. The resultant liquid rubber composition was put in a mold for injection molding having a core (diameter: 10 mm, made of SUS304 steel) serving as the shaft which was set therein, and cross-linking was conducted by heating the composition under cross-linking conditions including a temperature of 130° C. for two minutes. Subsequently, the cross-linked product was stripped off from the mold, thereby preparing a base roller having a base rubber layer formed over the outer peripheral surface of the shaft.

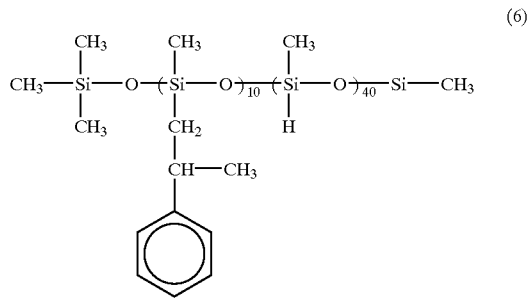

(6)

Then, 100 parts NBR (made by Nihon Zeon Co., Ltd., NIPOLE DN 401), 30 parts conduction agent (acetylene black), 0.5 parts stearic acid, 5 parts ZnO (zinc white), 1 part vulcanization accelerator BZ, 2 parts vulcanization accelerator CZ, and 3 parts sulfur were kneaded in accordance with the above-mentioned method. Subsequently, the material for the intermediate layer (coating solution) was prepared by dispersing the kneaded mixture in an organic solvent. Then, 100 parts polyurethane-based elastomer (made by Nihon Polyurethane Industry Co., Ltd., NIPPOLAN 2304), 20 parts carbon black, and 25 parts hardener (made by Dainippon Ink & Chemicals, Inc., BARNOCK D-750) were kneaded in accordance with the above-mentioned method, and then the kneaded mixture was dispersed in an organic solvent, thereby preparing the material for forming the surface layer (coating solution).

The intermediate layer was formed by coating the material for forming the intermediate layer (coating solution) onto the outer peripheral surface of the base roller. The surface layer was formed by coating the material for forming the surface layer (coating solution) onto the outer peripheral surface of the intermediate layer. The intermediate layer was thus formed on the outer peripheral surface of the base rubber layer, and the roller for office automation equipment having a three-layer structure having a surface layer formed on the outer peripheral surface of the intermediate layer was thus manufactured. The base rubber layer had a thickness of 4 mm; the intermediate layer had a thickness of 25 μm; and the surface layer had a thickness of 10 μm.

EXAMPLE 2

A base roller was prepared in the same manner as in Example 1 except that the amount of blended paraffin-based oil (made by Nihon Sun Oil Co., Ltd., SUNPAR 150 OIL, sulfur content: not more than 0.01 wt. %, viscosity at 40° C.: 92.6 mm²/s) taking the place of the mineral oil was modified to 50 parts. A three-layer structured roller for office automation equipment was manufactured by use of this base roller in the same manner as in Example 1.

EXAMPLE 3

A base roller was prepared in the same manner as in Example 1 except that the liquid rubber was replaced by a styrene-butadiene copolymer liquid rubber (made by Kuraray Co., Ltd., KURAPRENE LIR-310) [Mn: 30,000, structural unit (α) content: 2.2 wt. %); the mineral oil was replaced by a paraffin-based oil (made by Nihon Sun Oil Co., Ltd., SUNPAR 2100 OIL, sulfur content: not more than 0.01 wt. %, viscosity at 40° C.: 186.4 mm²/s); the amount of blended paraffin-based oil was modified to 50 parts. A three-layer structured roller for office automation equipment was manufactured by use of this base roller in the same manner as in Example 1.

EXAMPLE 4

A base roller was prepared in the same manner as in Example 1 except that the liquid rubber was replaced by an isoprene liquid rubber (made by Kuraray Co., Ltd., LIR-30) [Mn: 29,000, structural unit ($\alpha$) content: 1.8 wt. %], the mineral oil was replaced by a paraffin-based oil (made by Nihon Sun Oil Co., Ltd. SUNPAR 150 OIL); the amount of blended paraffin-based oil was modified to 30 parts; and the amount of blended hydrosilyl cross-linking agent was changed to 2 parts. A three-layer structured roller for office automation equipment was manufactured by use of this base roller in the same manner as in Example 1.

EXAMPLE 5

A base roller was prepared in the same manner as in Example 1 except that the mineral oil was replaced by a paraffin-based oil (made by Nihon Sun Oil Co., Ltd., SUN-PAR 150 OIL) and the amount of blended paraffin-based oil was changed to 10 parts. A three-layer structured roller for office automation equipment was manufactured by use of this base roller in the same manner as in Example 1.

EXAMPLE 6

A base roller was prepared in the same manner as in Example 1 except that the mineral oil was replaced by a paraffin-based oil (made by Nihon Sun Oil Co., Ltd., SUN-PAR 150 OIL), and the amount of blended paraffin-based oil was modified to 80 parts. A three-layer structured roller for office automation equipment was manufactured by use of this base roller in the same manner as in Example 1.

EXAMPLE 7

A base roller was prepared in the same manner as in Example 1 except that the amount of blended mineral oil was changed to 10 parts. A three-layer structured roller for office automation equipment was manufactured by use of this base roller in the same manner as in Example 1.

EXAMPLE 8

A base roller was prepared in the same manner as in Example 1 except that the amount of blended mineral oil was changed to 200 parts. A three-layer structured roller for office automation equipment was manufactured by use of this base roller in the same manner as in Example 1.

EXAMPLE 9

A base roller was prepared in the same manner as in Example 1 except that the mineral oil was replaced by an aromatic oil (made by Idemitsu Kosan Co., Ltd., AC-460, sulfur content: 0.310 wt. %, viscosity at 40° C.: 444.8 mm$^2$/s), and the amount of blended aromatic oil was changed to 100 parts. A three-layer structured roller for office automation equipment was manufactured by use of this base roller in the same manner as in Example 1.

Comparative Example 1

A base roller was prepared in the same manner as in Example 1 except that the mineral oil was not included. A three-layer structured roller for office automation equipment was manufactured by use of this base roller in the same manner as in Example 1.

Comparative Example 2

A base roller was prepared in the same manner as in Example 1 except that the mineral oil was not used, and the amount of blended hydrosilyl cross-linking agent was modified to 1.3 parts. A three-layer structured roller for office automation equipment was manufactured by use of this base roller in the same manner as in Example 1.

Comparative Example 3

A base roller was prepared in the same manner as in Example 1 except that the mineral oil was replaced by an aromatic oil (made by Idemitsu Kosan Co., Ltd., AH-16, sulfur content: 0.32 wt. %, viscosity at 40° C.: 662.3 mm$^2$/s). A three-layer structured roller for office automation equipment was manufactured by use of this base roller in the same manner as in Example 1.

Comparative Example 4

A base roller was prepared in the same manner as in Example 1 except that a silicone-based oil (made by Shin-Etsu Kagaku Co., Ltd., KF-410) was used in place of the mineral oil and the amount of blended silicone-based oil was changed to 50 parts. A three-layer structured roller for office automation equipment was manufactured by use of this base roller in the same manner as in Example 1.

Various properties were measured and evaluated in accordance with the following criteria for the rollers for office automation equipment of the Examples and the Comparative Examples thus obtained. The results thereof are shown in the following Tables 1 to 3.

Compressive Permanent Strain Property (Cs)

The compressive permanent strain property (Cs) was measured in accordance with JIS K 6301 under conditions including a temperature of 70° C., a test time of 22 hours, and a compression ratio of 25%. A measured value of not more than 5% suggests a very good compressive permanent strain and a satisfactory permanent set resistance.

Hardness

*: MD-1

Hardness of the base rubber layer of the roller for office automation equipment was measured by means of a micro-rubber hardness meter Model MD-1 (Type A) made by Kobunshi Keiki Co., Ltd.

*: Asker-C

Asker-C hardness of the base rubber layer of the roller for office automation equipment was measured in accordance with SRIS 0101.

Low-temperature Bleedability

A roller having a base rubber layer formed thereon was left for a month in an environment of 0° C., and then bleeding of the softener was visually observed. The criteria for evaluation were as follows:

○: No bleeding of the softening agent;

Δ: Slight bleeding of the softening agent;

×: Serious bleeding of the softening agent.

Reaction Stability

After rubber kneading and mixing, the liquid rubber composition, the material for forming the base rubber layer, was stored for 30 days in an environment at 15° C., and subjected a cross-linking reaction. When the hardness (MD-1) in an 8 mm-thick sheet formed immediately after rubber kneading/blending is assumed to be A°, and the hardness (MD-1) after storage B°, then a composition having an (A–B)° is under 1° was marked 0, and a composition having an (A–B)° of at least 0.1° was evaluated as ×.

TABLE 1

| | Example | | | | | |
|---|---|---|---|---|---|---|
| | 1 | 2 | 3 | 4 | 5 | 6 |
| Compressive permanent strain (%) | 1.3 | 1.2 | 1.5 | 2.0 | 1.1 | 2.1 |
| Hardness MD-1 | 10° | 17° | 30° | 11° | 37° | 5° |
| Asker-C | 34° | 44° | 55° | 34° | 64° | 33° |
| Low-temperature bleedability | ○ | ○ | ○ | ○ | ○ | Δ |
| Reaction stability | ○ | ○ | ○ | ○ | ○ | ○ |

TABLE 2

| | Example | | |
|---|---|---|---|
| | 7 | 8 | 9 |
| Compressive permanent strain (%) | 1.2 | 1.8 | 2.1 |
| Hardness MD-1 | 36° | 5° | 22° |
| Asker-C | 64° | 32° | 41° |
| Low-temperature bleedability | ○ | ○ | ○ |
| Reaction stability | ○ | ○ | ○ |

TABLE 3

| | Comparative example | | | |
|---|---|---|---|---|
| | 1 | 2 | 3 | 4 |
| Compressive permanent strain (%) | 1.1 | 6.0 | 1.5 | 7.2 |
| Hardness MD-1 | 38° | 14° | 20° | 21° |
| Asker-C | 67° | 35° | 48° | 47° |
| Low-temperature bleedability | ○ | ○ | ○ | x |
| Reaction stability | ○ | ○ | x | ○ |

The results shown in Tables 1 to 3 suggest that all the rollers for office automation equipment of the Examples showed an excellent reaction stability and gave satisfactory hardness, permanent set resistance and low-temperature bleedability.

In the roller for office automation equipment of Comparative Example 1, in contrast, hardness is high because no mineral oil is used. The roller for office automation equipment of Comparative Example 2, in which the amount of blended hydrosilyl cross-linking agent is reduced without adding a mineral oil, shows a serious compressive permanent strain, leading to a low permanent set resistance. In the roller for office automation equipment of Comparative Example 3, in which a softening agent containing considerable sulfur was used, cross-linking is impaired, leading to a low reaction stability. The roller for office automation equipment of Comparative Example 4, in which a silicone oil is used in place of a mineral oil, shows a serious compressive permanent strain, is low in permanent set resistance, and has an inferior low-temperature bleedability.

In the roller for office automation equipment of the present invention, the base rubber layer formed on the outer peripheral surface of the shaft is formed of a liquid rubber composition containing a specific liquid polymer (constituent A), a hydrosilyl cross-linking agent (constituent B), a hydrosilylation catalyst (constituent C), and a mineral oil (constituent D) containing not more than 0.31 wt. % sulfur. As a result, the roller obtained does not suffer from impairment of the cross-linking reaction or a delay therein, is excellent in permanent set resistance and low-temperature bleedability, and has a low hardness, thus producing an excellent image.

If a naphthene-based oil or a paraffin-based oil is used as the specific mineral oil (constituent D), no photosensitive drum contamination occurs, and the resultant roller becomes particularly suitable for use as a roller for office automation equipment.

What is claimed is:

1. A roller for office automation equipment, comprising a shaft and a base rubber layer formed on an outer periphery of said shaft, wherein said base rubber layer is formed of a liquid rubber composition containing the following constituents (A) to (D):

(A) a liquid rubber, derived from at least one of butadiene and isoprene, and having a structural unit (α) having an alkenyl group on the side chain thereof;
   (B) a hydrosilyl cross-linking agent;
   (C) a hydrosilylation catalyst; and
   (D) a mineral oil containing not more than 0.31 wt. % sulfur.

2. A roller for office automation equipment according to claim 1, wherein said mineral oil is at least one of a naphthene-based oil or a paraffin-based oil.

3. A roller for office automation equipment according to claim 2, wherein said mineral oil includes a naphthene-based oil.

4. A roller for office automation equipment according to claim 3, wherein the blending ratio of said naphthene-based oil is within a range of from 10 to 200 weight parts relative to 100 weight parts liquid rubber.

5. A roller for office automation equipment according to claim 2, wherein the mineral oil includes a paraffin-based oil.

6. A roller for office automation equipment according to claim 5, wherein the blending ratio of said paraffin-based oil ithin a range of from 10 to 80 weight parts relative to weight parts liquid rubber.

* * * * *